(12) United States Patent
Cheymol et al.

(10) Patent No.: US 11,099,005 B2
(45) Date of Patent: Aug. 24, 2021

(54) OPTICAL FIBRE SENSOR FOR MEASURING DEFORMATION, SAID SENSOR OPERATING IN A HARSH ENVIRONMENT

(71) Applicant: COMMISSARIAT A L'ENERGIE ATOMIQUE ET AUX ENERGIES ALTERNATIVES, Paris (FR)

(72) Inventors: Guy Cheymol, Bures sur Yvette (FR); Laurent Remy, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/045,719

(22) PCT Filed: Apr. 10, 2019

(86) PCT No.: PCT/EP2019/059047
§ 371 (c)(1),
(2) Date: Oct. 6, 2020

(87) PCT Pub. No.: WO2019/197447
PCT Pub. Date: Oct. 17, 2019

(65) Prior Publication Data
US 2021/0156673 A1 May 27, 2021

(30) Foreign Application Priority Data

Apr. 13, 2018 (FR) ...................................... 1853233

(51) Int. Cl.
*G01B 11/16* (2006.01)
*G01D 5/353* (2006.01)
(Continued)

(52) U.S. Cl.
CPC ............... *G01B 11/16* (2013.01); *G01B 9/02* (2013.01); *G01D 5/266* (2013.01);
(Continued)

(58) Field of Classification Search
CPC ...... G01B 11/16; G01B 9/02; G01B 2290/25; G01D 5/35374; G01D 5/35306; G01D 5/35312; G01D 5/266; G01D 5/268
See application file for complete search history.

(56) References Cited

U.S. PATENT DOCUMENTS 5,345,519 A 9/1994 Lu
2006/0233484 A1 10/2006 Van Neste et al.
(Continued)

FOREIGN PATENT DOCUMENTS

EP 1 014 064 A2 6/2000
FR 2 929 701 A1 10/2009

*Primary Examiner* — Jonathan M Hansen
(74) *Attorney, Agent, or Firm* — BakerHostetler

(57) ABSTRACT

A fiber-optic sensors for measuring deformation, intended to operate in a harsh environment is provided. The sensor comprises a Fabry-Perot-cavity-based optical measurement head, a linking optical fiber and an expansion reserve case, the case comprising a segment of the linking optical fiber. The inside thickness of the case is comprised between one and several millimeters, the case being flat and of shape referred to as bicorne shape, the shape comprising a convex central portion and two concave symmetric ends, the optical fiber forming, inside the bicorne, one and only one arch, the segment of the optical fiber being, in addition, tangent to the internal surfaces of the reserve case, whatever the temperature conditions.

5 Claims, 4 Drawing Sheets

(51) Int. Cl.
*G01B 9/02* (2006.01)
*G01D 5/26* (2006.01)

(52) U.S. Cl.
CPC ..... *G01D 5/35306* (2013.01); *G01D 5/35312* (2013.01); *G01D 5/35374* (2013.01); *G01B 2290/25* (2013.01)

(56) References Cited

U.S. PATENT DOCUMENTS

2007/0019898 A1* 1/2007 Chimenti ................ G01L 1/246
385/12
2013/0083314 A1 4/2013 Lambourne
2018/0073916 A1* 3/2018 Launay .................. G01H 9/004

* cited by examiner

OPTICAL FIBRE SENSOR FOR MEASURING DEFORMATION, SAID SENSOR OPERATING IN A HARSH ENVIRONMENT

CROSS-REFERENCE TO RELATED APPLICATIONS

This application is a National Stage of International patent application PCT/EP2019/059047, filed on Apr. 10, 2019, which claims priority to foreign French patent application No. FR 1853233, filed on Apr. 13, 2018, the disclosures of which are incorporated by reference in their entirety.

FIELD OF THE INVENTION

The field of the invention is that of movement sensors for use in a harsh environment. By "harsh environment", what is meant is the environment found inside nuclear reactors. Such an environment is characterized by high temperatures, of about several hundred degrees, and high levels of radiation, both with respect to the gamma radiation and neutron doses to be withstood.

BACKGROUND

Nuclear instrumentation for irradiations in research reactors calls upon a certain number of measurements. Mention will be made of measurements of temperature, neutron flux, gamma radiation and the elongation of certain parts under test in the reactor. The latter measurements of elongation are mainly carried out using inductive sensors. These measurements may also be carried out using fiber-optic sensors, the main advantages of which are that they are less bulky, less intrusive and more precise than previous sensors.

These optical sensors are white-light Fabry-Perot sensors. The operating principle of sensors suitable for use at high temperatures and under high radiation doses is illustrated in FIGS. 1, 2 and 3. FIG. 1 shows a general overview of a sensor of this type. It comprises a wide-spectrum light source 1; one portion of the flux emitted by this source is transmitted to the measurement optical fiber 3 by means of an optical Y-coupler denoted 2. Before the end 4 of this optical fiber, a cylindrical rod 5 is placed on the axis of the optical fiber. The end of the fiber and the rod are securely fastened to a sample E to be measured via point bonds that do not generate excessive stresses in the material. They are separated by a length defining the gauge length Lj.

The end 4 located closest the optical fiber is reflective. FIG. 2 shows an enlarged view of this portion of the sensor. The end of the optical fiber and the end 6 of the rod 5 facing it form a Fabry-Perot cavity of length Lc. The variation in the length Lj that it is sought to measure is equal to the variation in Lc. To give an idea of order of magnitude, this distance Lc is equal to about 100 microns. In FIG. 2, the arrows represent the various optical signals emitted and reflected. One portion of the optical signal is reflected by the end of the optical fiber. A second portion of the optical signal is reflected by the rod. These two signals superpose and form an interference system.

Since the two reflected signals have traveled different paths, they are phase-shifted. This phase-shift depends on the wavelength λ of the signal and on the distance Lc. An optical signal the spectrum of which has periodic maxima and minima is obtained, as shown in FIG. 3. This FIG. 3 contains two graphs. The top one shows the spectral distribution of the source at emission as a function of wavelength λ and the bottom one shows the spectral distribution of the reflected signal as a function of wavelength λ. The reflected spectrum is said to be "channeled". The spectrum is analyzed by a spectrometer 7 as may be seen in FIG. 1. From the position of the channels, the analyzing and measuring means 8 are easily able to deduce the distance L. By way of example, the light source is a superluminescent light-emitting diode (SLED) emitting at a wavelength near 960 nanometers and the width of the emission spectrum of which is about 50 nanometers. If the distance Lc is equal to 100 microns, about ten exploitable channels are thus obtained.

More precisely, the number Δk of whole bright fringes or whole dark fringes between two known wavelengths λ1 and λ2, the wavelength λ2 being longer than the wavelength λ1, is related to the cavity length LC by the formula:

$$Lc = \frac{\Delta k}{2\left(\frac{1}{\lambda 1} - \frac{1}{\lambda 2}\right)}$$

A sensor of this type must have a precision of about one micron. The sensor must be simple to produce, so as to ensure its resistance to harsh environments, while guaranteeing the precision of the measurements. It generally comprises an optical head and a linking optical fiber. The link allows the measurement to be carried out remotely in a place in which the irradiation and temperature constraints are much less.

The actual optical head, i.e. the portion of the sensor comprising the Fabry-Perot cavity, is generally inserted into a metal capsule. The end of the fiber and the rod are fastened to this metal capsule via two first anchoring points. The tube is securely fastened to the object the elongation of which it is sought to measure via two second anchoring points. Additional information on the production of such an optical head may be found in patent FR 2 929 701 entitled "Capteur d'allongement à fibre optique".

The simplest and most robust design for the optical link 10 is shown in FIG. 4. It consists in protecting the optical fiber 3 with a stainless-steel sheath 11 of a length L'. The fiber is held in its sheath via spots of ceramic adhesive at points 12 and 12bis, as may be seen in FIG. 4. The second point 12bis of bonding between the steel sheath and the optical head, which corresponds to the bonding point furthest from the optical head, is located in a region in which the temperature and radiation are greatly decreased with respect to the region in which the optical head and sample are located. This second point of bonding between the steel sheath and the optical head is robust and absorbs the various stresses transmitted by the fiber during the phases of manufacture, installation and test, that could be transmitted to the bonding point 12 near the cavity. Specifically, the first point 12 of bonding between the steel sheath and the optical head is less voluminous and less resistant. The second point 12bis of bonding between the steel sheath and the optical head thus prevents deterioration of the first bonding point 12, leading to a modification of the cavity length Lc during the measurement phase.

One way of preventing stresses from being applied to the fiber end is proposed in patent US 2006/0233484, which is entitled "Adhesive-assembled fiber-optic interferometer". This solution employs an assembly comprising a second cavity that does not perform a measurement function but that mechanically decouples the measurement cavity from the optical fiber linking the measurement cavity to the instrumentation. There is a single bonding point on the segment between the two cavities.

This solution is unsuitable for use in a harsh environment. Specifically, when this link is subjected to the harsh environment of the sensor, two effects occur: the steel sheath expands more than the fiber under the effect of the heat and the optical fiber retracts under the effect of the intense neutron radiation. The latter effect is referred to as "compaction". The optical fibers used are made of silica. The resulting length differential may reach more than 1 percent of relative variation. To place this second cavity in a region in which the temperature and radiation are greatly decreased, it is necessary to increase the distance between the two cavities. The length differential between the fiber and the metal sheath may then lead, depending on the position of the single bonding point, to a drift in the Fabry-Perot measurement cavity or to a large variation in the length of the second cavity, which prevents a good transmission of the signal to this second cavity, these two detrimental effects possibly occurring simultaneously.

If the two ends of the link comprise two bonding points, there is a risk that the generated tensile forces will modify the cavity length Lc and cause deterioration of the bond near the cavity.

One possible solution to this problem is to create, during installation at room temperature, an expansion reserve in the optical link, so that the optical fiber may freely retract without applying stresses to the bonds to its sheath or its protective jacket. This proposed solution allows for the small volume available, in particular in proximity to the sample, and for the need to avoid placing a large thermal mass near the sensor.

This solution is shown in FIG. 5 at two different temperatures symbolized, on the left of the figure, by thermometers. The optical fiber 15 is held in a closed chamber 16 the width of which is larger than the diameter of the optical fiber. When cold, the optical fiber forms a serpentine, as may be seen in the illustration at the top of FIG. 5. When hot, as may be seen in the illustration at the bottom of FIG. 5, the box 16 expands, as does the stainless-steel sheath of the link, to which said box is joined, and the serpentine of the optical fiber 15 stretches without applying tensile stresses to the bonding points. One of the drawbacks of this system is that there is a risk that, during thermal cycling, the optical fiber will become stuck to the walls of the box instead of returning to its ideal shape as drawn—a high local curvature may then form, possibly damaging the fiber. It is important for the optical fiber not to be able to press locally against the walls.

The expansion reserve casing or case according to the invention does not have these drawbacks. Its shape is designed to contain only a single arch of optical fiber, whatever the length differential between fiber and stainless-steel sheath, so as to minimize as best as possible rubbing and possible sticking of the optical fiber against the walls of the casing during the phases of operation in a harsh environment, during which phases the optical fiber may undergo compaction and experience thermal cycling.

SUMMARY OF THE INVENTION

More precisely, the subject of the invention is a fiber-optic sensor for measuring deformation, said sensor being intended to operate in a temperature range of a few hundred degrees, said sensor comprising a Fabry-Perot-cavity-based optical measurement head, a linking optical fiber and an expansion reserve case, said case comprising a segment of said linking optical fiber, characterized in that the inside thickness of the case is comprised between one and a few millimeters, said case being flat and of shape referred to as bicorne shape, said shape comprising a convex central portion and two concave symmetric ends, the optical fiber being free to form, inside the bicorne, one and only one arch, the segment of the optical fiber being, in addition, tangent to the internal surfaces of the reserve case, whatever the temperature conditions.

Advantageously, the optical fiber is made of silica, it comprises a sleeve made of aluminum and the case is made of stainless steel.

Advantageously, the height of the expansion reserve case is about one quarter of its width.

Advantageously, the height of the expansion reserve case is about 20 millimeters.

Advantageously, at the link end that is furthest from the optical measurement head, the optical fiber is held by a high-temperature ceramic adhesive in proximity to the exit of the case.

BRIEF DESCRIPTION OF THE DRAWINGS

The invention will be better understood and other features will become apparent on reading the following non-limiting description, which is given with reference to the appended figures, in which.

DETAILED DESCRIPTION

The fiber-optic sensor for measuring elongation according to the invention comprises a Fabry-Perot-cavity-based optical measurement head such as described above, a linking optical fiber and a specific fiber-optic expansion reserve. Typically, this sensor is arranged so as to measure elongations of about 150 microns over a gauge length of 15 mm with a precision of one micron.

This optical sensor is most particularly intended to operate in a harsh environment. This environment is characterized by high temperatures, of about several hundred degrees, and high levels of radiation, both with respect to the gamma radiation and neutron doses to be withstood.

Figure 1:
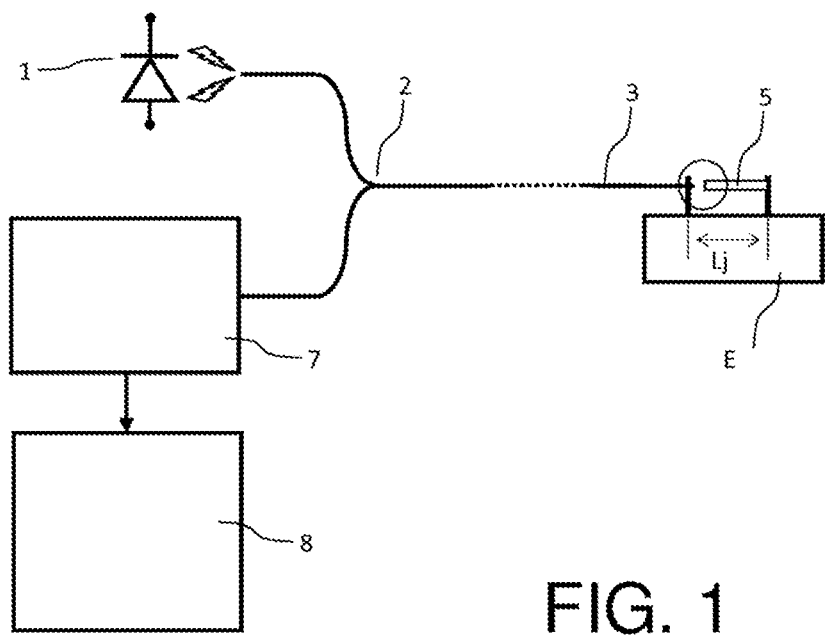
FIG. 1 shows a general overview of a Fabry-Perot-cavity-based movement sensor.
Figure 2:
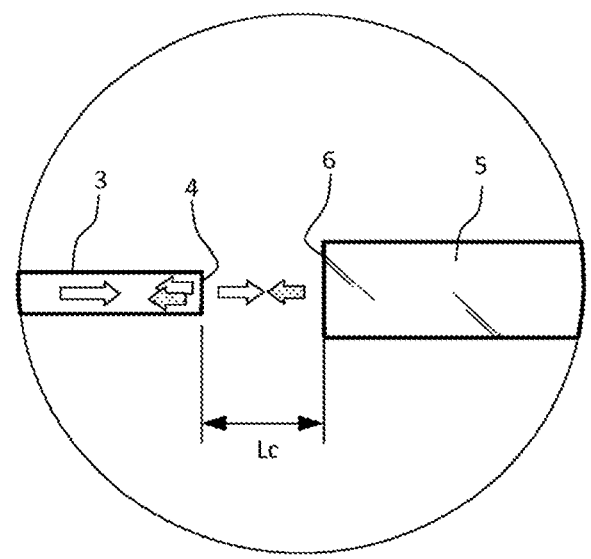
FIG. 2 shows an enlarged view of the Fabry-Perot cavity and of the operation thereof.
Figure 3:
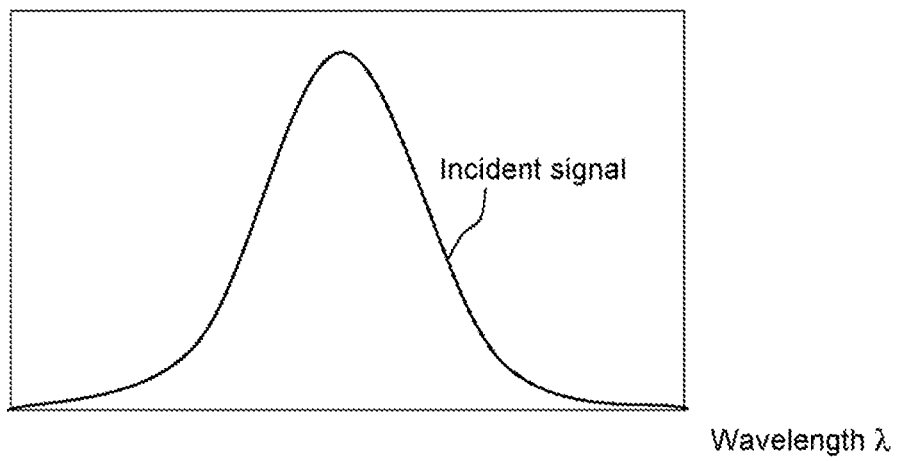
FIG. 3 shows the spectrum of the emission source before and after passage through the Fabry-Perot cavity.
Figure 3:
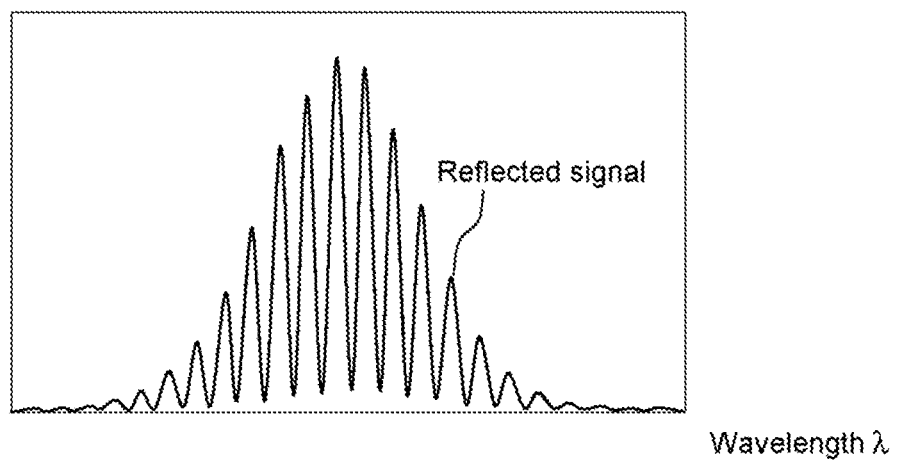
Figure 4:
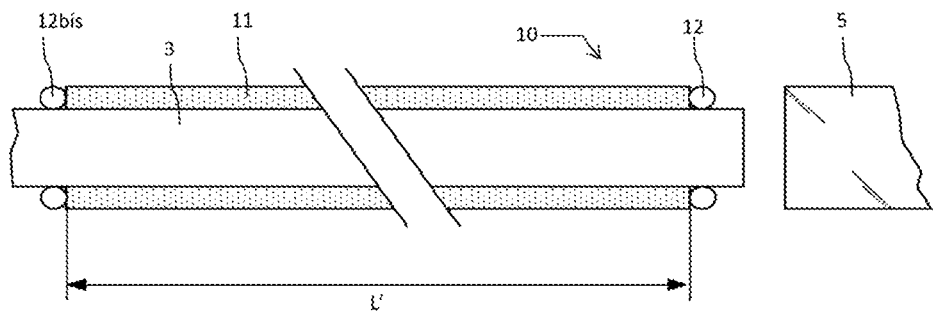
FIG. 4 shows a cross-sectional view of the optical link.
Figure 5:
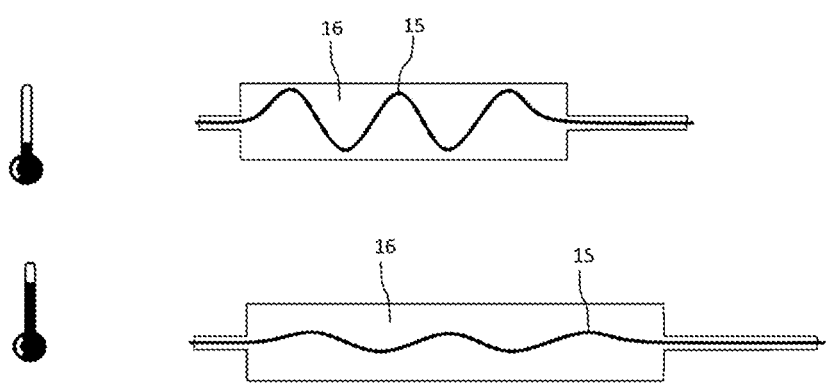
FIG. 5 shows an embodiment of an expansion reserve according to the prior art.
Figure 6:
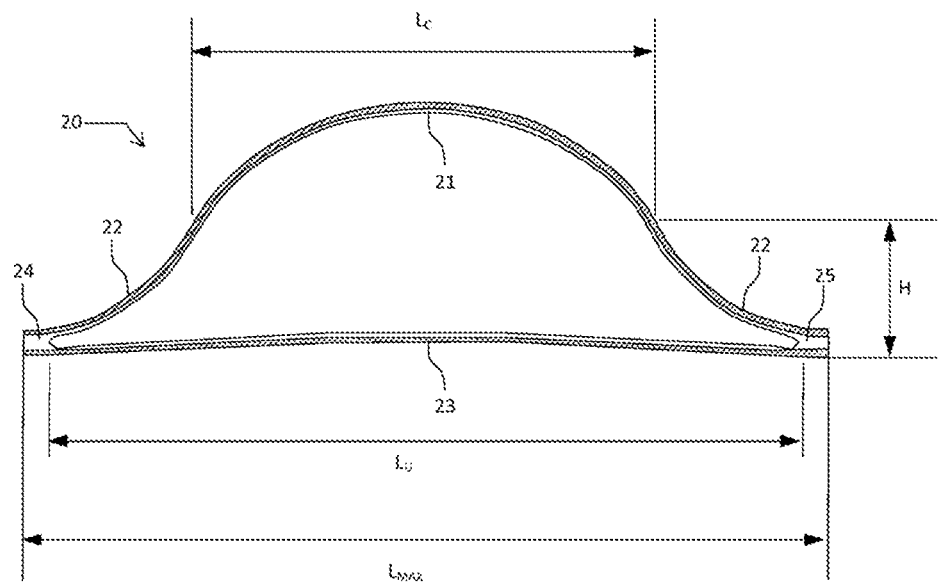
FIG. 6 shows an embodiment of an expansion reserve according to the invention.

FIG. 6 shows a cross-sectional view of this fiber-optic expansion reserve 20. This expansion reserve takes the form of a hollow and flat case of small thickness comprising a segment of the linking optical fiber. More precisely, the internal thickness of the case is similar to the diameter of the linking optical fiber. This optical fiber is not shown in FIG. 6.

This case has a shape referred to as "bicorne" shape, the top portion of this shape comprising a convex central portion 21 and two concave symmetric ends 22, the optical fiber being held at one 24 of the two ends of the case and passing through the second end 25 of the case, the optical fiber forming, inside the bicorne, one and only one arch, the height of which varies with the expansion or compaction of the optical fiber. The bottom portion 23 of the case is slightly concave.

The geometry of this case may be characterized by a certain number of dimensions, namely its length $L_U$ excluding end fittings for assembly purposes, its maximum length $L_{MAX}$, its height H at the inflection point separating the concave portions from the convex portion, and the length of the convex portion $L_C$. By way of non-limiting example, a case according to the invention may have the following geometric features (values rounded to one tenth of a millimeter):

Length $L_{MAX}$: 66.0 mm
Length $L_U$: 60.0 mm
Height H: 9.2 mm
Length $L_C$: 38.3 mm
Inside thickness: 1.2 mm
Total thickness: 2.5 mm The material of the case must be chosen to resist harsh sensor environments, such as described above. It may be made of stainless steel, the optical fiber being made of silica and comprising an aluminum coating.

This casing may be made by 3D printing using the technique of selective laser melting (SLM).

At the link end that is furthest from the optical measurement head, the optical fiber is held at 30 mm from the exit of the case by a ceramic adhesive that is resistant to high temperatures of about a few hundred degrees.

Figure 7:
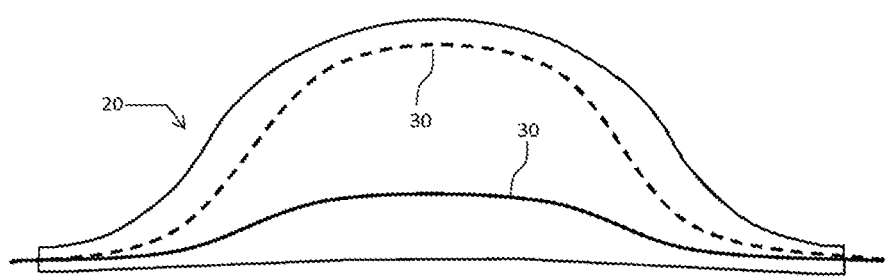
FIG. 7 shows the operation of the expansion reserve according to the invention.

The expansion reserve case is located, at a distance of at least 500 millimeters from the optical head so that its own heat does not corrupt the elongation measurement carried out by the optical head, in a position such that, beyond the point of fiber/sheath bonding away from the optical head, compaction and thermal expansion are negligible, and such that the bulk of this case is acceptable at this position. The operation of this case in shown in FIG. 7. This figure shows a cross-section view of the case 20 and the optical fiber 30 at two temperatures. The dashed line is representative of the position of the optical fiber at low temperature and the solid curve is representative of the position of the optical fiber at high temperature. These two curves are of arch shape. When the temperature increases, the optical fiber experiences two effects as has been described, an expansion that is smaller than the sheath of the link and a compaction under the effect of radiation. In the end, its length in the case varies and this variation in length is absorbed by the height of the arch. A case such as defined above is able to absorb a maximum differential variation between the expansion and compaction of 12 millimeters.

The advantage of this arch shape is that the optical fiber moves inside the case without much rubbing so as to prevent any risk of sticking of the optical fiber liable to create excessive mechanical stresses in the optical fiber. In addition, the optical fiber remains tangent to the surfaces with which it makes contact. The sensor may thus undergo a high number of thermal cycles without deterioration, thus significantly increasing its lifetime and its reliability.

The invention claimed is:

1. A fiber-optic sensor for measuring deformation, said sensor being intended to operate in a temperature range of a few hundred degrees, said sensor comprising a Fabry-Perot-cavity-based optical measurement head, a linking optical fiber and an expansion reserve case, said case comprising a segment of said linking optical fiber, wherein the inside thickness of the case is similar to the diameter of the linking optical fiber, said case being flat and of shape referred to as bicorne shape, said shape comprising a convex central portion and two concave symmetric ends, the optical fiber being free to form, inside the bicorne, one and only one arch, the segment of the optical fiber being, in addition, tangent to the internal surfaces of the reserve case, whatever the temperature conditions.

2. The fiber-optic sensor as claimed in claim 1, wherein the optical fiber is made of silica, in that it comprises a sleeve made of aluminum and in that the case is made of stainless steel.

3. The fiber-optic sensor as claimed in claim 1, wherein the height of the expansion reserve case is one quarter of its width.

4. The fiber-optic sensor as claimed in claim 3, wherein the height of the expansion reserve case is 20 millimeters.

5. The fiber-optic sensor as claimed in claim 1, wherein at the link end that is furthest from the optical measurement head, the optical fiber is held in proximity to the exit of the case by a high-temperature ceramic adhesive, this high temperature being about a few hundred degrees.

* * * * *